Aug. 28, 1945.  D. W. HOPKINS  2,383,861
THREE WAY VALVE
Filed Dec. 7, 1942   2 Sheets-Sheet 1

INVENTOR.
David Walter Hopkins,
BY Barr, Borden & Fox
ATTORNEY.

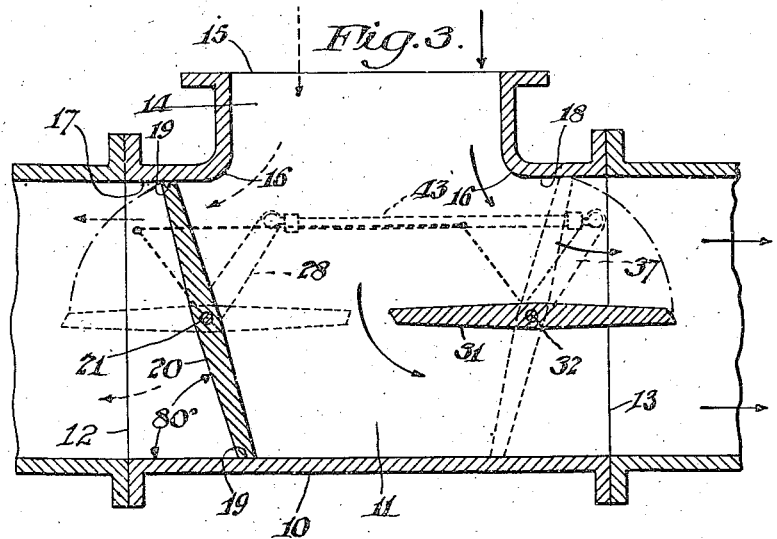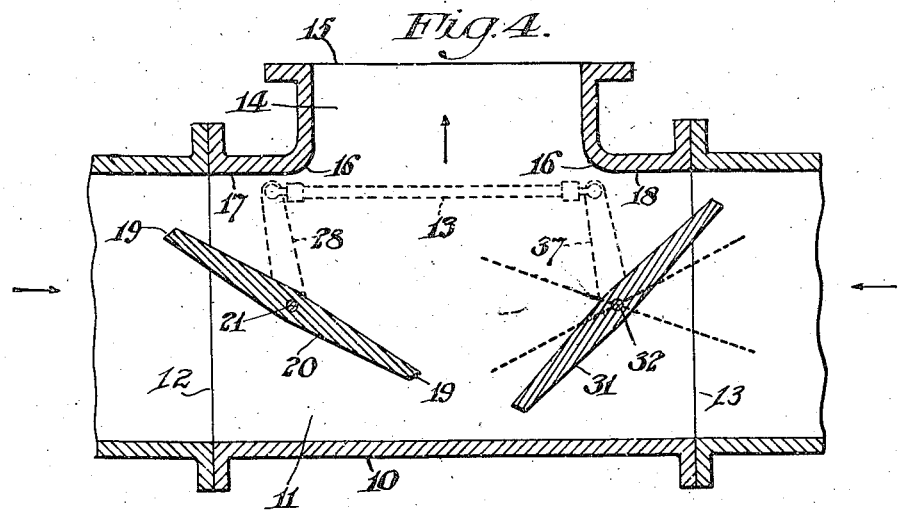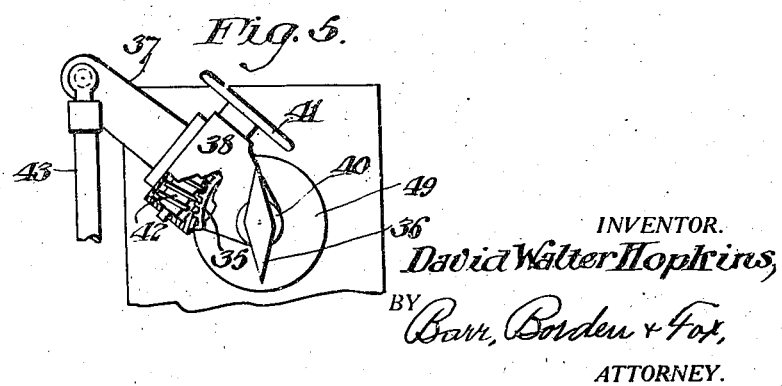

Patented Aug. 28, 1945

2,383,861

UNITED STATES PATENT OFFICE 2,383,861

THREE-WAY VALVE

David W. Hopkins, Philadelphia, Pa.

Application December 7, 1942, Serial No. 468,155

1 Claim. (Cl. 137—144)

This invention relates to three way valves, and pertains particularly to a three way valve controlled by two coupled butterfly vanes.

In an application Serial No. 449,935, filed July 6, 1942, now Patent No. 2,351,613, granted June 20, 1944, I disclosed a three way valve comprising a cylindrical conduit intersected by a common ported extension controlled by a single butterfly vane. This represents a valuable addition to the art of valves. It renders excellent and exact valve functions in practically every situation, but, owing to the length of the oval vane compared to its width, the vane, in order to clear the common opening and bear only against the cylindrical portion of the valve body is necessarily disposed in the passage or conduit at approximately 50° to the axis of the cylindrical portion in a closed disposition thereof. This requires considerable power, owing to the extra leverage of the elongated oval vane. It also militates against sharp control of the flow pursuant to a slight vane movement incident to the merest cracking of the valve, whereas in a butterfly valve with a more nearly normal disposition of the valve in the seated position, say of approximately 80°, an appreciable "cracking" can be accomplished with the formation of the merest trickle opening. This will be readily understood when it is realized that with a setting of 50°, a valve vane movement of say 1° has a large component transverse of the conduit to open a wide passage, whereas with a setting of approximately 80°, a vane movement of 1° has its largest component axially of the conduit with a consequent minute or thin opening in the conduit, by which a mere trickle of fluid can be controlled. Thus, for trickle flow control and tight shut off, for instance, such three way valve as is disclosed in said application is not very efficient in certain large valve sizes.

It is among the objects of this invention; to provide improvements in valves; to provide a valve body with a pair of individual vanes for control purposes; to provide a pair of butterfly valves in coupled relation; to provide a mixing valve with a pair of individual control vanes which is arranged for adjustment for forming a three-way valve; to provide a fixed linkage for a pair of relatively adjustable oscillatable valve elements; to provide valve control mechanism of simplicity and a wide range of control; to provide a single valve body with three openings with each of two of the openings controlled respectively by a vane, with control linkage such that the said two openings can be used as fluid intakes for fluids to pass in merged condition through the third opening, and the linkage being susceptible to adjustment so that either of the two openings can be selectively coupled with the third opening, while the other of the said two openings is closed; to provide a three-way valve body with a common port and two selective ports with individual butterfly vanes between the common port and the respective selective ports with a control whereby the establishment of a fluid passage between a selective and the common port will be accompanied by the closing of communication between the common port and the other selective port; to provide in a valve a pair of butterfly vanes disposed in a cylindrical conduit therein at such an obtuse angle as to facilitate close flow control; to reduce the power requirements of three way valves; to provide a pair of coupled butterfly vanes in a valve in such manner that the closing torque of one augments the torque required to open the other; to provide in a valve a pair of butterfly vanes, each so designed that fluid pressure with a small pressure drop in either direction urges the vanes toward closing, with means coupling the vanes for synchronous movement in the same direction, but with the vanes oppositely inclined so that one vane closes with a clockwise movement and the other with a counter-clockwise movement so that the closing urge of one vane augments the torque on and therefore reduces the power necessary to open the other; and other advantages will become more apparent as the description proceeds.

In carrying out the invention in a preferred embodiment, a single T-shaped valve body is provided, with port apertures at the free ends of the cross bar and leg thereof, a butterfly vane is provided in both sides of the cross bar besides the leg in position to control the flow through the adjacent port aperture of the cross bar as each swings appropriately on its pivot, an arm is mounted to project radially from the axis of one vane pivot so as to move fixedly therewith, an arm is mounted to project radially from the axis of the other vane coupled through an adjustable connection to the pivot of said other vane to move therewith, a link connects the free ends of both arms for coupling them permanently in fixed driving relation, and a power unit is disposed so as to selectively move one vane. The adjustable connection is such that the particular vane can assume any desired angular position relative to its arm while maintaining a driving connection therewith.

In the accompanying drawings, forming part of this description,

Fig. 3 represents a diagrammatic section through the T-shaped valve showing in full lines one relatively adjusted position of the respective butterfly vanes for one operating condition of the three-way valve with unidirectional flow, and in dotted lines the other relatively adjusted position of the vanes for an opposite unidirectional flow.

Figure 1:
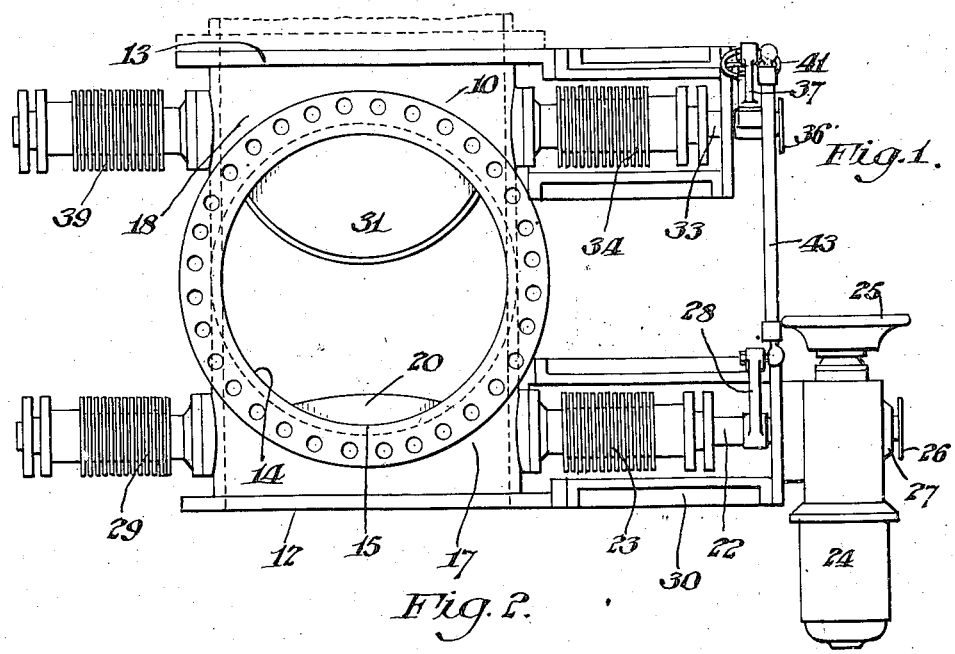
Fig. 1 represents an end elevation of an illustrative form of the invention, looking into the common port of the T-shaped valve.
Figure 2:
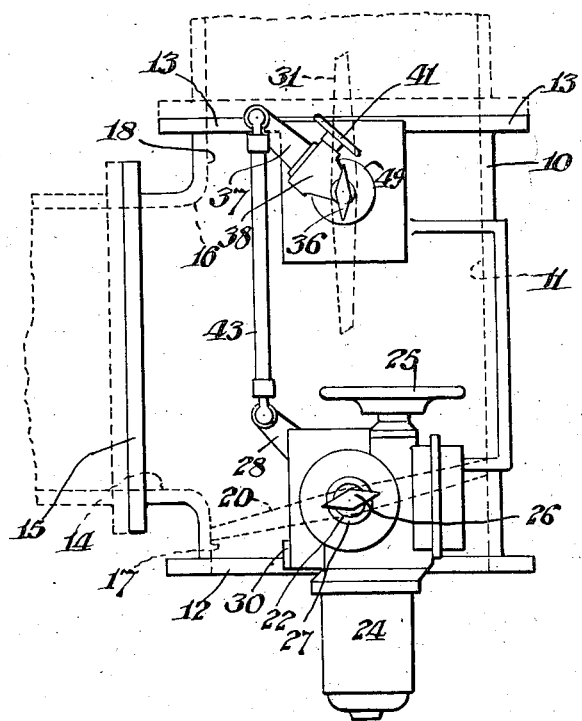
Fig. 2 represents a plan of the same.

Fig. 4 represents a diagrammatic section through the T-shaped valve showing in full lines one relatively adjusted position of the respective butterfly vanes for one bidirectional flow operating condition of the three-way valve and in dotted lines other relatively adjusted positions of the vanes for different bidirectional flows; and Fig. 5 represents a fragmentary plan, partially insection, of the variably coupled arm and vane shaft.

In the preferred embodiment of the invention a generally T-shaped valve housing 10 is provided, having a substantially cylindrical through channel or conduit 11 as the cross bar of the T, terminating in the conventionally flanged mouth, or port opening 12 at one end, and at the other in the similar flanged mouth or port opening 13. The openings 12 and 13 are concentric with the longitudinal axis of the conduit 11. Extending laterally in the housing is the perpendicular short cylindrical passage 14 ending in a common port or mouth 15, and forming the leg of the T. The axis of the passage 14 and mouth 15 is preferably normal to the axis of the conduit 11, and is substantially centered between the flanged ends 12 and 13. The short extension 14 merges internally into the transverse conduit 11, by the carefully rounded corners 16, and there is a short axial extent of conduit 11 between the extension 14 and the end of conduit 11, at their closest points, as at 17 and 18 respectively.

A butterfly vane 20, preferably provided as the valve controlling element, is pivoted on an axis 21 lying in a longitudinal plane containing the axis of the conduit 11 normal to the axis of the mouth 15 and extension 14, and illustratively located in a transverse plane normal to the axis of the conduit 11 and tangential to the outer surface of the extension 14. The vane 20 is preferably mounted for leakproof disposition in the channel 11 by having suitably flattened bosses abutting bushings in the housing, in accordance with the disclosure in said three way valve application already mentioned, is slightly oval in profile and has a seating surface or edge 19 which at the termination of its long diameter, is beveled to sealingly engage the surface of the conduit 11. The vane 20 is mounted for oscillation with a shaft 22 which may pass through a heat-dissipating stuffing box 23 mounted on the housing, as is disclosed in said application, and at its outer end is connected with a power unit 24 having suitable limit switches (not shown). In the illustrative form disclosed, the power unit comprises a reversible electric motor, provided with a declutching element or otherwise provided so that a manual control wheel 25 may be caused to function to actuate the whole in the event of power failure. Illustratively and not limitatively, the declutching unit may be constructed in accordance with the disclosure of my application Ser. No. 457,580, filed September 7, 1942. It will be obvious that any sort of power unit could be used in place of the electric one disclosed, or that the entire valve actuation could be permanently manual if desired. The lower end of the shaft 22 may be journaled in a suitable heat-dissipating stuffing box 29, while the upper end extends beyond the power unit 24 and carries a pointer or indicator 26, which, if desired, may overlie a suitably graduated scale 27. Pointer 26 bears a predetermined angular relation to the vane 20, preferably being parallel therewith, so that the vane position is indicated by the double ended pointer shown. The shaft 22 carries, between the end of the stuffing box unit 23 and the power unit 24, a rigid perpendicular splined arm 28, which moves about axis 21 of the shaft 22 as the vane is moved. Suitable bracket supports 30 mount the power unit 24 on the housing 10.

It will be evident that the edge 19 of the vane 20 adjacent to the extension 14 will seat against the short axial extension 17 of the conduit 11, while the other diametrically opposite edge will seat on the opposite surface of the conduit 11 in the portion opposite to port 14 and mouth 15. From this position, in which the opening 12 is tightly sealed with the vane sloping at an angle of approximately 80° to the conduit, the opening of the valve finds the upper edge portion 19, adjacent to the extension, moving outwardly toward and through the flanged mouth 12 while the opposite end moves toward opening 15 in extension 14.

It is to be noted that vane 20, which is mounted and arranged to close with a clockwise movement, is made relatively thick, tapering from the center about axis 21, for strength, and also to augment the obtuseness of the angle formed by the bevelled edge 19, with the advancing or inner surface of vane 20 in its closing. This angle is at the top of vane 20 in Fig. 4 where it merges into edge surface 19. The appreciable area of edge 19 coupled with the obtuseness of the angle just described forms in the line of flow of the entrance opening 12 a cambered surface over which the fluid accelerates, with a consequent reduction of pressure against the advancing face of the vane in its closing direction. The differential pressures thus effective on opposite faces of the vane during a flow and thus during a drop in pressure, exerts a closing torque on the vane due to flow into entrance 12. There is no corresponding flow phenomena on the opposite edge of the vane during flow into entrance 12 so that the closing torque due to differential pressures on one edge is substantially unopposed and unbalanced at the other, so that the vane urge is toward closing. On the other hand, the opposite, or lower edge in the diagram of Figs. 3 and 4, exerts a corresponding differential pressure effect on the vane during flows outwardly of opening 12, which are not opposed or balanced by the flow past the opposite edge of the vane, so that the effective or resultant torque incident to flows out through opening 12 is also toward closing of the vane.

The effective torque production of the flows past the vane are augmented somewhat by the fact that the vane has as an incident of the bevel of edge 19, a greater area below the axis 21 than the area above the axis, on the inner surface of the vane, while the outer surface thereof has a greater area above than below axis 21. In each case, the area differential causes differential opposing pressures on the vane in either direction of flow to exert a closing torque on the vane, so that a flow in either direction of vane 20 effects a resultant torque in a clockwise direction, of great power.

In a similarly symmetrically disposed relation in the T-shaped valve the oppositely inclined complemental butterfly vane 31, is pivoted on an axis 32, by being secured to a shaft 33, which latter is cooled, as before, by a stuffing box 34 above the vane. Toward its free end the shaft 33 carries a worm pinion gear 35 rigidly keyed thereto. The free end of the shaft carries the elongated pointer or indicator 36 which is maintained in permanent angular relation, preferably parallelism, to the vane 31. The lower end of shaft 33 is journalled in stuffing box 39. An arm 37, having an enlargement 38 is provided at its inner end with a bushing 40 for journalling the arm on the shaft 33, for relative movement between the shaft and the arm. A hand wheel 41 is rigidly carried by a worm gear 42 journalled in the enlargement 38, in permanent mesh with the worm pinion 35. It will be obvious that the angular relation of the vane 31 and the arm 37 can be changed to anything desired by simple rotative manipulations of the hand wheel 41. The free end of the arm 37 is pivotally connected to one end of link 43 of fixed dimensions and the opposite end of the latter is pivotally connected to the free end of the permanently fixedly shaft-coupled arm 28. A fixed member is provided as at 49 upon which a graduated scale may be carried relative to which the pointer 36 can be read to establish exact angular dispositions of vane 31. Vane 31 closes in a counter-clockwise direction and has the same flow-induced closing torque, and for the same reasons, as vane 20, except, of course, that it is in the opposite direction from that of vane 20.

As shown in Fig. 3, with the vane 20 tightly closed and sealed in its end of the valve at the efficient angle shown, of approximately 80°, the opposite vane 31 is preferably swung to a wide open position on its pivot 32, which is accomplished by simply turning the worm screw or gear to change the relation of the vane 31 to its arm 37, then the port 15 serving as an intake mouth will have its entire intake flow discharged out through mouth 13. This is unidirectional. From this position a reversal of the motor 24 running the vane 20 to its mid-position with the port 12 wide open simultaneously swings vane 31 on its pivot 32 to the tightly closed position for a reversed unidirectional flow.

As shown in Fig. 4, in the full line position, the valve of this invention as used for bidirectional flow, may, for instance, have port 12 coupled with one source of fluid supply, with opening 13 coupled to another and it is desired to have the valve serve as a mixing unit with the output passing through port or mouth 15. Conversely with the intake through port 15 to be divided and passed into ports 12 and 13 with controlled proportionate output from the respective mouths 12 and 13, the vane 20 may be moved about its axis until a desired proportionate passage opening, say of 55%, for instance, is secured, as determined by the indicator 26 on its scale, while, of course, changing the worm gear position so as to continuously back-off the vane 31 on arm 37 so as not to have binding, if this is necessary. After vane 20 is properly angularly positioned, worm gear 42 is then actuated to secure, for instance, a vane position for vane 31 in conduit 11 of a proportionate passage opening of say 45%. If now the limit switches on the power unit 24 are suitably set, and a time is used to energize the power unit, a timed sequential change of mixing rate can be secured, swinging or varying between the 55%-45% just mentioned, and its reversal, or 45%-55%. Obviously, any other mixing ratio can be secured by simply changing the relation of the vane 31 to arm 37, as shown in dotted lines in this figure.

From the position of Fig. 3 (and 2) it will be obvious that a small angular movement of the vanes on their respective pivots toward cracking vane 20, for instance, will simply crack the valve and permit a small trickle, in place of the wide flow derivable from the same amount of valve opening of the single vane in the three-way valve of said application.

The disposition of both vanes in the same housing minimizes any differential expansions incident to the heat of the fluids under control and moreover, any differential expansion of the valve body relative to the link of fixed length coupling the two vanes if any should be developed, can be immediately and simply nullified by a slight turn of the worm gear hand wheel.

The illustrative form disclosed is preferred for most installations, but it is to be observed that, within the broad scope of the coupling and actuating linkage disclosed, other types of valves may be controlled than the butterfly valves illustrated, just as two separate independent valves in a common line may be controlled by the arm adjustment and fixed linkage disclosed.

It is of importance and is preferred that the respective clockwise and counter-clockwise closures of the respective vanes be provided as disclosed, as, not only does each vane present a smaller torque requirement than the single vane of the three way valve because of smaller lengths of vane, but the coupling of the vanes for synchronous actuation finds the power requirement for opening still further reduced by the added torque secured by the closing of the coupled oppositely closing vane in its automatic urge toward closing.

Having thus described my invention, I claim:

In valves, a valve housing of T shape, a power unit mounted operatively on the housing, an arm actuated by the power unit for pivotal movement relative to the housing, a second arm mounted for pivotal movement relative to the housing, a link of predetermined and fixed length pivotally connecting the respective arms for synchronous movement through a predetermined fixed path, a vane element mounted operatively in the housing and fixedly coupled to the first mentioned arm to move therewith, a second vane element mounted operatively in the housing and coupled to the second mentioned arm to move therewith on its same pivot, means for varying the coupling between a selected one of said vane elements and its respective arm, and visual indicating means in fixed relation to said selected vane element by which its angular relation to its said arm can be observed.

DAVID W. HOPKINS.